United States Patent [19]
Burbidge et al.

[11] Patent Number: 5,737,322
[45] Date of Patent: Apr. 7, 1998

[54] SELECTIVE CALL SYSTEM AND A SECONDARY STATION FOR USE THEREIN

[75] Inventors: Richard C. Burbidge, Reigate; Andrew T. Yule, Oxted; Anthony K. Sharpe, Cambridge, all of England

[73] Assignee: U.S. Philips Corporation, New York, N.Y.

[21] Appl. No.: 430,518

[22] Filed: Apr. 27, 1995

[30] Foreign Application Priority Data

Apr. 27, 1994 [GB] United Kingdom .................... 9408321

[51] Int. Cl.$^6$ ........................................... H04Q 7/18
[52] U.S. Cl. .................. 370/311; 340/825.44; 455/38.3
[58] Field of Search ...................... 340/825.44; 455/33.1, 455/38.1, 38.3; 370/311, 313

[56] References Cited

U.S. PATENT DOCUMENTS

| | | | |
|---|---|---|---|
| 4,882,579 | 11/1989 | Siwiak | 340/825.44 |
| 4,918,437 | 4/1990 | Jasinski et al. | 340/825.44 |
| 4,968,966 | 11/1990 | Jasinski et al. | 340/825.44 |
| 5,128,934 | 7/1992 | Jasinski | 340/825.44 |
| 5,162,790 | 11/1992 | Jasinski | 340/825.44 |
| 5,442,750 | 8/1995 | Harriman, Jr. et al. | 370/236 |

FOREIGN PATENT DOCUMENTS

| | | |
|---|---|---|
| 9004314 | 4/1990 | WIPO . |
| 9428685 | 12/1994 | WIPO . |

*Primary Examiner*—Melvin Marcelo
*Attorney, Agent, or Firm*—Arthur G. Schaier

[57] ABSTRACT

A selective call system comprises at least one base station which transmits address code words at a predetermined data rate. High rate telescript information having a length of more than 500 characters, for example, an E-mail message, is transmitted at a data rate greater than that used for sending address code words. In the event of the system comprising a simulcast system, intersymbol interference (ISI) may occur and in order to reduce the effects of ISI on the decoding the telescript information while avoiding an unnecessarily large drain on a secondary station's batteries, the telescript information as received for a specific secondary station is stored and subsequently equalized in non-real time. The secondary station can comprise a mobile terminal unit and may include a transmitter for transmitting acknowledgement or other response signals, for example, such as spread spectrum signals. The acknowledgement signals may be used for locating the mobile terminal unit.

31 Claims, 5 Drawing Sheets

SELECTIVE CALL SYSTEM AND A SECONDARY STATION FOR USE THEREIN

BACKGROUND OF THE INVENTION

1. Field of the Invention

The present invention relates to a selective call system and to a secondary station for use in such a system.

2. Discussion of the Related Art

An example of a selective call system is a paging system. A paging system generally comprises a controller which formats pager radio identification codes (RICs) and data messages according to the particular protocol being operated by the system, for example CCIR Radiopaging Code No. 1, alternatively known as POCSAG, and a plurality of geographically separate base stations. Generally the transmissions by the base stations are what is termed simulcast, that is the same signal is broadcast substantially simultaneously by all the base stations in an area. Simulcast is known per se and it is unnecessary to discuss it in detail. A person with a paging receiver roaming between the various base stations can receive its RIC, if and when transmitted, from two or more in range base stations. Assuming that the paging receiver is not equidistant from the base station antennas the receipt of the transmissions will be at different instances due to the different propagation times. Another reason for transmissions being received at different times is that the base station transmitters are not synchronised. The strength of each signal may be similar even though the distances from the base station antennas are different because of topographical features such as tall buildings, hills and the like, thus causing intersymbol interference effects. If corresponding bits of a message are received by a paging receiver within say a quarter of a bit period of each other, then they can be decoded fairly reliably without any additional measures being taken. As a consequence there is an implicit maximum bit rate for such signals to ensure reliable reception. For transmitters separated by not more than 10 km, this maximum bit rate is of the order of 10 kb/s. If the circumstances are such that the differences in the propagation times leads to a high degree of overlap then serious intersymbol interference (ISI) occurs and it may not be possible to recover the transmitted message signal unless it is first equalised to remove the ISI. Equalisation is known per se from the literature and it is sufficient to say that a large number of computations are required and if done in real time on a high rate signal, then a powerful computation device which consumes a relatively large current is required. This in turn means that a power source having a high peak current is required and such sources may be unacceptable to a manufacturer from the point of view of price and/or size. In any event, for battery powered equipments, such as paging receivers which are on standby for long periods, it is important to conserve battery power as much as practically possible. Accordingly in the interests of battery current conservation, considerations of using high rate signalling protocols for paging are not attractive.

SUMMARY OF THE INVENTION

An object of the present invention is to provide a high bit rate selective call system and a secondary station for use therein.

According to one aspect of the present invention there is provided a selective call system comprising a controller, at least one base station coupled to the controller, the or each base station comprising a transmitter, the controller having means for encoding data message signals at a higher bit rate than address signals of secondary stations, and at least one secondary station having signal receiving means, decoding means coupled to the receiving means and control means which in response to identifying an address code word adapts the secondary station to receive the higher bit rate message signal.

According to a second aspect of the present invention there is provided a secondary station for use in a selective call system, the secondary station having signal receiving means, decoding means coupled to the receiving means, control means which in response to identifying an address code word adapts the secondary station to receive a higher bit rate message signal transmitted by a base station.

The selective call system in accordance with the present invention may either be devoted entirely to the transmission of data messages or be part of an existing selective call system in which address code words and short data messages are transmitted at the same data rate. By transmitting longer data messages at a higher data rate they are effectively shortened in the time domain but this is at the expense of increased ISI requiring these messages to be equalised by the secondary station in non-real time.

By only equalising selected parts of the transmission the energy consumption of an individual secondary station is considerably reduced. Consequently the secondary station can be designed to operate using a low capacity battery or similar power sources.

Further, by equalising the received data message signal in non-real time, for example after it has been received, it is possible to do the various computations at a rate which will result in the battery current consumption being less than that which would be required when operating in real time. Consequently a high data rate selective call system can be implemented without using an especially powerful computation device in the secondary stations which device will not require a high current output power source.

Additionally since not all users of the selective call system will have secondary stations capable of receiving high rate data message signals, it is necessary to make the signalling format transparent to such users. This may be achieved by transmitting sync code words at a data rate which is used by the most basic secondary station in the system, address code words at a higher data rate and data messages at yet a higher rate than the address code words, the choice of a particular sync code word giving an indication of the data rate used for the transmission of the address code word and the choice of a particular address code word giving an indication of the data rate used for the transmission of the data message. The control means in response to detecting a particular sync code word alters with the clock rate of the decoder in order to be able to receive and decode the address code word and in response to detecting that a high rate message is concatenated with the address code word, it arranges for the message to be stored as received and for it to be equalised subsequently.

According to a third aspect of the present invention there is provided a selective call system comprising a controller, at least one base station, the or each base station comprising a transmitter and a receiver, the controller having means for sending higher bit rate message signals by way of the or each base station, and at least one secondary station having signal receiving means, means for decoding a message signal addressed to the at least one secondary station, means for storing decoded message signals, transmitting means, means for storing a plurality of code sequences indicative of respective possible predetermined responses to a received message signal and means for selecting one of said plurality of code sequences to be transmitted by said transmitting means, the controller having means for identifying the code sequence in a received signal and thereby the response from the secondary station.

According to a fourth aspect of the present invention there is provided a selective call system comprising at least one base station, the or each base station having transceiving means and at least one secondary station having transceiving means, the or each base station having means for generating registration invitation signals and for transmitting said invitation signals, and said at least one secondary station having means for generating a registration signal in response to the receipt of an invitation signal and for transmitting said registration signal.

BRIEF DESCRIPTION OF THE DRAWINGS

The present invention will now be described, by way of example, with reference to the accompanying drawings, wherein.

In the drawings the same reference numerals have been used to indicate corresponding features.

DETAILED DESCRIPTION OF THE PREFERRED EMBODIMENTS

Figure 1:
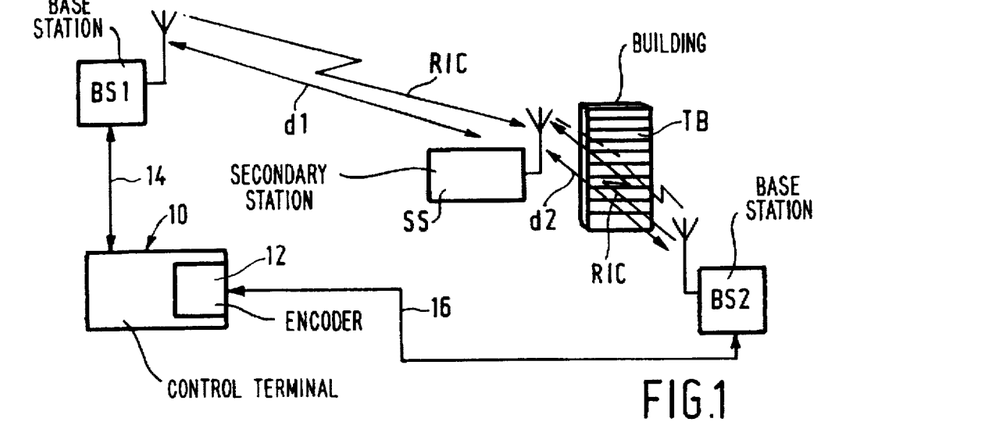
FIG. 1 is a block schematic diagram of a simulcast selective call system which is capable of sending normal paging signals as well as high rate data message signals.

The simulcast selective call system illustrated in FIG. 1, which may be a personal radio mail system, comprises a control terminal 10 which receives requests for paging calls to be made and, optionally, messages which depending on the system configuration may be sent with the paging calls or independently thereof. The control terminal 10 includes an encoder 12 which encodes and formats the paging calls and, where appropriate, concatenated messages in accordance with a suitable message code such as POCSAG. The control terminal 10 is connected by way of landlines 14,16 to base stations BS1,BS2, respectively. The base stations BS1,BS2 comprise transmitters operating in simulcast. Compensation for the differences in propagation times from the control terminal 10 to the base stations BS1,BS2 by way of the landlines 14,16 is implemented in a known way at the control terminal 10.

A secondary station SS which may be implemented as a pager, a cordless telephone, a cellular telephone or a data terminal, is able to roam in the coverage areas of the base station transmitters and generally will be able to receive paging calls. However the times of receipt of the signals by the secondary station SS and the relative strengths of the signals will depend on the distances d1,d2 between the respective base stations BS1,BS2 and the secondary station SS as well as topographical features such as the tall building TB in the signal path between the base station BS2 and the secondary station SS. Assuming d1=10 km and d2=1 km then the difference in propagation times will be approximately 30 μs. If the bit rate of the paging signal is no greater than 10 kb/s then the ISI due to the different times of receipt can be tolerated even if the signals are of similar strengths and the paging signal can be recovered without additional measures, such as equalisation.

Figure 2:
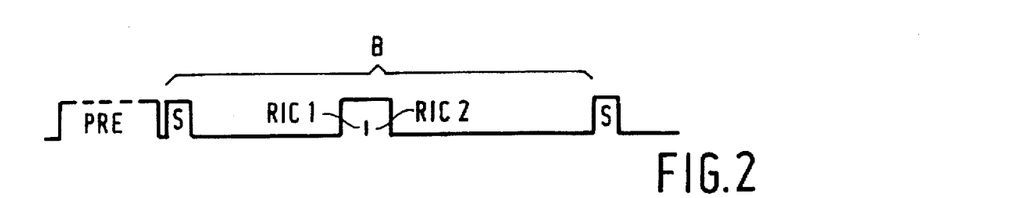
FIG. 2 is a timing diagram of the CCIR Radiopaging Code No. 1 (or POCSAG) code format.

For the sake of completeness the format of a POCSAG paging signal will be described briefly with reference to FIG. 2. Typically the control terminal will transmit a long sequence of signals having a duration of say one minute. As POCSAG is a non-synchronous system each sequence begins with a 576 bit preamble PRE which serves to enable the pager to achieve bit synchronisation. The preamble PRE is followed by batches B each formed by a 32 bit sync. code word S plus 8 frames, each frame having the duration of two 32 bit code words. A secondary station SS has one or more address code words known as Radio Identification Codes (RICs) allocated to it and also it is assigned to a predetermined one of the 8 frames. In POCSAG a RIC comprises not only an address code word but also an indication of which of the 8 frames it has been assigned to. This means that if the control terminal 10 has a paging call for a particular secondary station SS then its RIC or one of its RICs is transmitted in the frame assigned to that secondary station SS. As is well known a POCSAG pager will energise its receiver to receive the preamble PRE and first sync. code word S and then power down until just before its assigned frame when it is re-energised. Once the frame has expired, and assuming that there is no need for the receiver to remain energised, it is de-energised again until the next following sync. word is due.

In the event of a message being sent, the RIC of the destination secondary station is appended to the front of the message and it is despatched in its assigned frame. If the concatenated 32 bit message code words exceed the duration of a frame then apart from the insertion of the sync. code word S at the beginning of each batch, the message is transmitted uninterrupted. POCSAG requires the bit rate of the RIC and the message code words to be the same which is currently 1200 bits/second. Alphanumeric messages are encoded using ASCII which requires 7 bits per character. The duration of a POCSAG batch B at a bit rate of 1200 6/s is 0.4533 seconds.

However such a bit rate is too slow for long messages such as telescript, for example E-mail messages which may be greater than 500 characters long. The present invention can be implemented in several ways all of which can be transparent to say a tone-only POCSAG pager operating in accordance with the signal format shown in FIG. 2. However for compatibility reasons a basic bit rate of 1200 b/s is used for the transmission of a sync code word, a bit rate of 6.4 kb/s is used to transmit at least the address code words of which there are several types and which are used for setting/configuring a secondary station to receive a high rate message HRM and a higher bit rate of, say, 30 kb/s is used to transmit long data messages.

Figure 3:
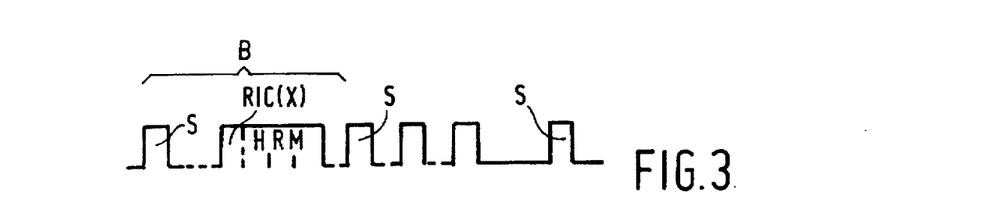
FIG. 3 is a timing diagram of a high rate code format.

The following example will begin at the left hand side of FIG. 3 with the transmission of a sync. code word S at the normal rate used in the selective call system. The sync code word is selected from a group of sync code words, each of which conditions the secondary station for the reception of at least the first code word in the next following transmission. In this instance the sync code word is one which identifies the data rate (of 6.4 kb/s) to be used for decoding the subsequently transmitted address code word RIC(x). The particular address code word RIC(x) chosen from a group of RICs assigned to the secondary station and indicates not only the address but also the data rate of a concatenated high rate message HRM. The next following sync code word S is transmitted at the basic bit rate of 1200 Hz and, as before, the sync code word is selected to indicate the data rate to be used in transmitting at least the first code word of the next following transmission within the current transmission sequence. At the commencement of the relevant frame the RIC(x) concatenated with a high rate message HRM is transmitted. The RIC(x) is sent at, say, 6.4 kb/s whilst the HRM is at a higher rate of, say, 30 kb/s. The HRM may have a different format, that is a different code word structure, to normal POCSAG message code words. In the event of the HRM spanning two batches, the sync code word is transmitted at the beginning of each batch at the normal data rate.

Figure 4:
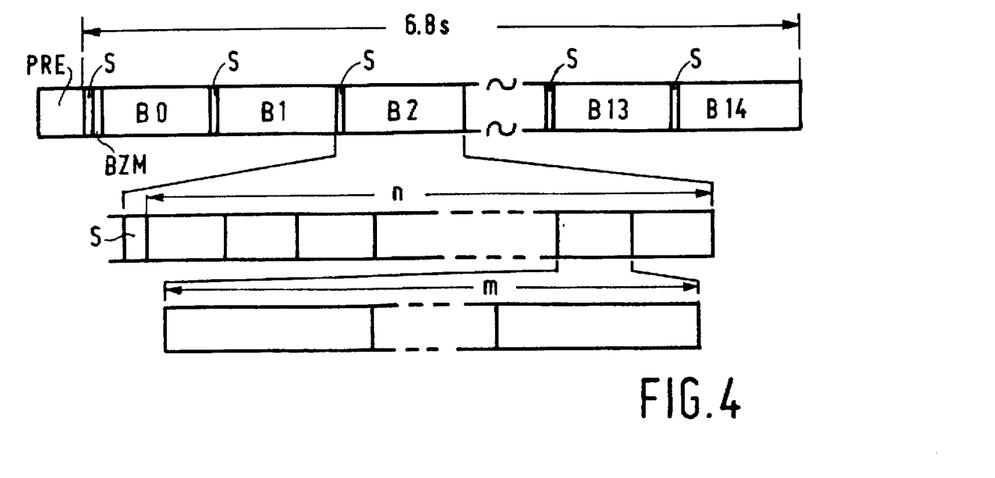
FIG. 4 is a timing diagram of an alternative message signal transmission format to that shown in FIG. 3.

FIG. 4 shows an alternative message format to that shown in FIG. 3 but which is compatible with POCSAG. This alternative format is a synchronous format and has a cyclic structure with each cycle having a duration of 6.8 seconds which is 15 times that of a POCSAG batch. This first cycle is optionally preceded by a preamble PRE of 32 bits. Each cycle comprises 15 batches B0 to B14 but unlike POCSAG the number, n, of frames to a batch and the number, m, of code words to a frame depend on factors such as the data rate and/or modulation scheme used in that batch. Each secondary station is allocated to one of the n frames, according to the frame specified by its RIC, and only examines address code words in that frame. The secondary station may be restricted to examining the allocated frame in only one of the batches in the cycle (also specified by the RIC). In order for a secondary station to be able to identify the start of a cycle when operating in batch mode, a code word, termed a batch zero marker (BZM), is inserted in the first frame of the first batch B0 of a cycle. The BZM is a non allocated address code word. When operating in a cycle mode the secondary station is allocated to only one frame in each cycle and in consequence the BZM is not required. In operation the sync code word at the beginning of each batch is transmitted at 1200 b/s to be compatible with POCSAG, the RIC is transmitted to say 6.4 kb/s and the HRM is at higher rate of say 30 kb/s. The format of a high rate numeric message code word may be different from that of a high rate alphanumeric code word.

As explained with reference to FIG. 1, the HRM signal may be subject to ISI which will require the signal as received to be equalised in order to obtain a decodable signal. If the equalisation is done by the secondary station in real time, the current consumption will be relatively high and will require a high output power source of a type which is unattractive for this application.

This problem can be overcome by a secondary station on receiving a high data message HRM storing everything that is received in a buffer memory, the size of which is known to the control terminal, and once the message is complete, the data is equalised off-line, that is in non-real time, which significantly reduces the peak current drain required of the battery. The equalisation technique used can be any suitable known technique such as decision feedback equalisation or Viterbi equalisation. Once the HRM has been equalised it is decoded and stored in a random access memory so that it can be displayed at the choice of the user.

Figure 5:
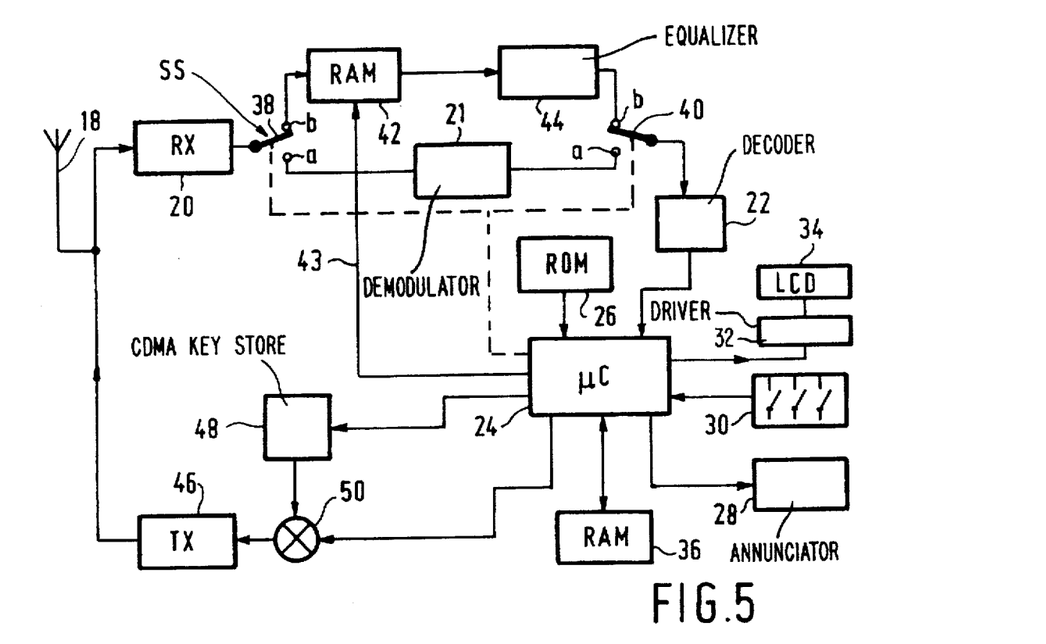
FIG. 5 is a block schematic diagram of a secondary station.

FIG. 5 is a block schematic diagram of a secondary station SS having the capability of transmitting acknowledgements or other messages as spread spectrum signals. For the moment, discussion of a transmitter 46, CDMA key store 48 and a multiplier 50 will be deferred as they relate to refinements of the basic embodiment.

The secondary station SS comprises an antenna 18 which is coupled to a receiver stage 20. An output of the receiver stage 20 is, in the non-HRM mode of use, coupled to an input of a decoder 22 by way of a demodulator 21. A microcontroller 24 is coupled to the output of the decoder 22 and controls the operation of the secondary station in accordance with a program held in a read only memory (ROM) 26. The microcontroller 24 has inputs/outputs, as appropriate, coupled to annunciating means 28 which may be audio, visual and/or tactile, a keypad 30, data output means, for example an LCD driver 32 which is coupled to an LCD panel 34, and a random access memory (RAM) 36 for storing any messages which have been received and decoded.

In operation the decoder 22 and the microcontroller 24 are continuously energised and the receiver stage 20 is energised in response to the particular battery economising protocol followed by the secondary station SS. When an address code word is received, it is demodulated, decoded, error corrected and checked to see if it is one assigned to the secondary station. Assuming it is, then depending on the programming of the microcontroller 24, the annunciating means 28 may be activated to inform the user that a call has been received. A user, by actuating a key or keys of the keypad 30, can inhibit one or more of the output devices of the annunciating means if required. If a short message at the same data rate as the address code word is concatenated with the paging call then once it has been decoded and error checked/corrected, the microcontroller 24 causes the decoded message to be stored in the RAM 36. By actuating a key or keys of the keypad 30, a user can instruct the microcontroller 24 to read-out the message from the RAM 36 to the LCD driver 32 which will cause the message to be displayed on the screen 34. The operation described so far is typical for many alphanumeric message pagers conforming to the POCSAG standard.

Referring to FIG. 5, in order to handle high rate messages HRM of a type as described with reference to FIG. 3, the secondary station SS further comprises a first and second changeover switching means 38,40 whose movable contacts (or electronic equivalents) are connected respectively to the output of the receiver stage 20 and to the input of the decoder 22. Corresponding fixed contacts "a" of the switching means 38,40 are connected to the input and output, respectively, of the demodulator. The other fixed contact "b" of the switching means 38 is connected to a RAM 42 whose output is coupled to the input of an equaliser 44 which also functions as a demodulator. The output of the equaliser 44 is coupled to the other fixed contact "b" of the switching means 40. Operation of the switching means 38,40 is controlled by the microcontroller 24.

The movable contacts of the switching means 38,40 are connected to their contacts "a" when the secondary station SS is in its standby mode. If a sync code word is received which indicates that the data rate of address code words transmitted in the following frames of the batch are to be transmitted at a higher bit rate, say 6.4 kb/s, the microcontroller causes the frequency of the clock rate signal applied to the decoder 22 to be increased. A secondary station on receiving an address code word which it recognises as being not only one which is allocated to it but also indicates the data rate of a concatenated high rate message HRM, causes the microcontroller 24 to actuate the switching means 38,40 to switch to their contacts "b" so that the HRM is stored, as received, in the RAM 42 which is clocked at the bit rate of the HRM. Once the complete message has been received, the data is read out of the RAM 42 for equalisation in non-real time at low power. The equalised signal is subsequently decoded and stored in the RAM 36.

Figure 6:
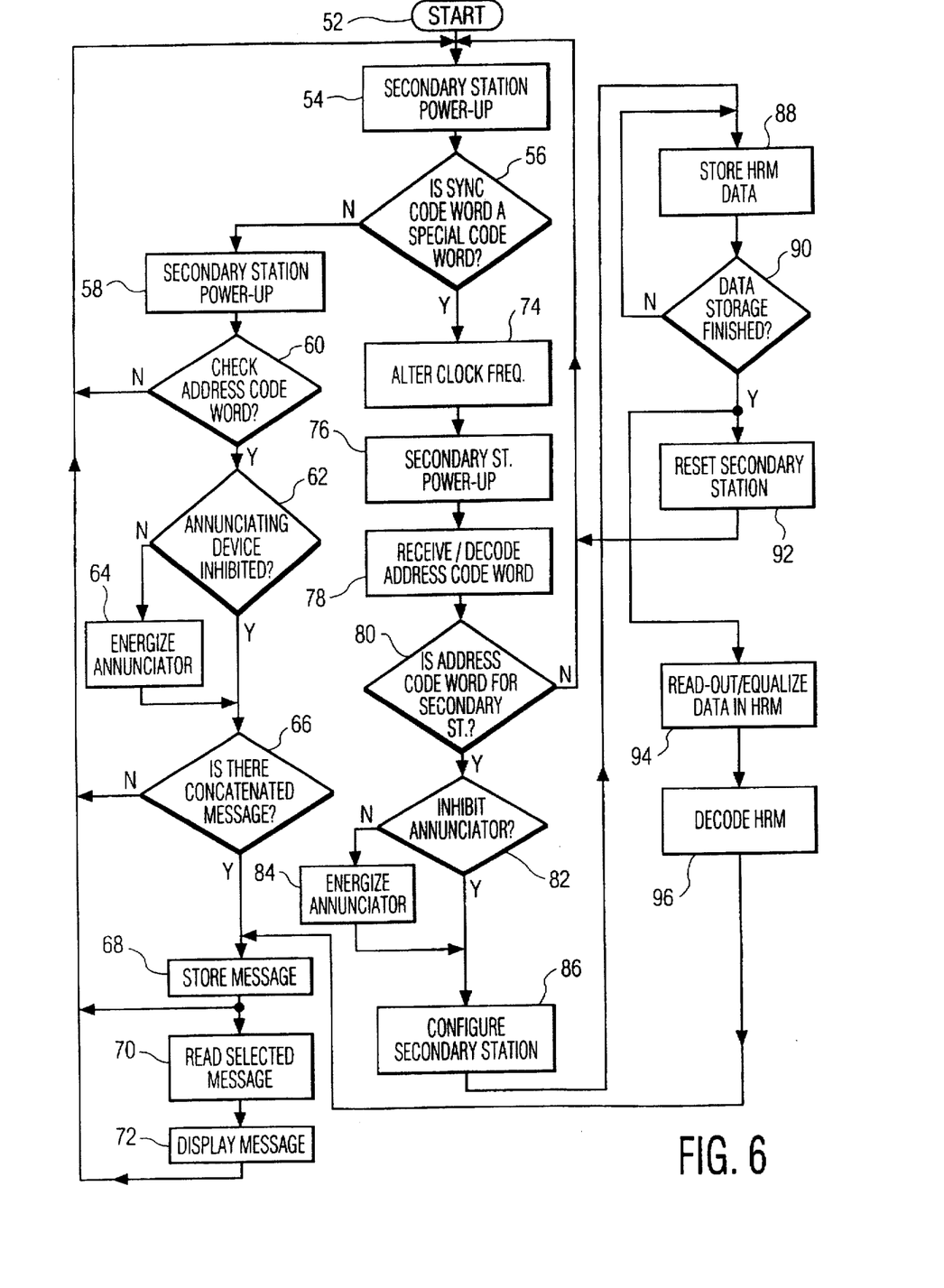
FIG. 6 is a flow chart relating to one method of processing high rate data messages.

FIG. 6 is a flow chart of the sequence of operations required in order to implement the reception of, and subsequent equalisation, of high rate data messages.

Block 52 indicates the start of the flow chart and assumes that the secondary station is bit and batch synchronised. Block 54 indicates a secondary station SS powering-up to receive a sync code word. Block 56 denotes checking if the sync code word is a special sync code word indicating amongst other things that a higher than normal bit rate is being used to transmit address code words in the following frames of the batch.

Assuming that the answer is No (N), the flow chart proceeds to a block 58 indicating a secondary station powering up to receive any address code words which are transmitted in its allocated frame. Block 60 indicates checking any address code words received to see if they are for the secondary station. If the answer is No (N) the flow chart reverts to the block 54. If the answer is Yes (Y), then in block 62 a check is made to see if the annunciating devices have been inhibited and if not (N) the flow chart proceeds to block 64 which indicates the step of energising the annunciating devices. If the answer in the block 62 is Yes (Y), the flow chart from the blocks 62,64 proceeds to a block 66 which checks to see if there is a concatenated message. If not (N), the flow chart reverts to the block 54. However, if Yes (Y), the flow chart proceeds to a block 68 which denotes the operation of storing a message. Blocks 70,72 denote the respective operations of reading out a selected message in response to a user activating the keypad and displaying it.

If the answer in block 56 is Yes (Y) the flow chart proceeds to block 74 which relates to the operation of the microcontroller causing the clock frequency to be altered to that indicated by the sync code word. Block 76 denotes the secondary station powering-up for its frame in order to be able to receive any address code words which are transmitted. Block 78 relates to the operation of receiving and decoding the address code words. In block 80 the decoded address code words are checked to see if any one of them is for the secondary station. If the answer is No (N) the flow chart reverts to the block 54 but if it is Yes (Y) a check is made to see if the annunciating devices are to be inhibited and if the answer is No (N), these devices are energised, block 84. If the answer in the block 82 is Yes (Y), the flow chart from this block and the block 84 proceeds to the block 86 which relates to the microcontroller configuring the secondary station to receive the concatenated HRM. Block 88 relates to storing the HRM data. Block 90 relates to checking if the data storage has finished. If it has not (N), the flow chart reverts to the block 88 but if it has (Y) the flow chart proceeds to a block 92 which relates to the secondary station resetting itself in readiness for the next sync code word.

A branch of the flow chart from the Y output of the block 90 proceeds to a block 94 which relates to reading-out and equalising the data in the HRM and then to a block 96 which relates to decoding of the HRM. Thereafter, the flow chart proceeds to the block 68 in which the decoded HRM is stored.

It is emphasised that this flow chart relates to a secondary station which is able to operate as a POCSAG message pager and as a terminal for receiving HRMs. However, the secondary station may be configured to operate in a selective call system in which only telescript messages are transmitted using the message format generally described with reference to FIG. 4 in which case the flow chart will omit at least blocks 58 to 66 but may include other operations, for example registration and acknowledgements, and checks. Furthermore if ISI is not a problem then equalisation can be omitted.

The illustrated secondary station SS includes a low power transmitter 46 whereby acknowledgements and/or responses such as message error reports can be relayed to any in-range base station. The actual acknowledgement sent is generated by the microcontroller 24 and will be a single pulse or a short, low bit rate signal. In the case of a single pulse having a duration of 100 mS and transmitted at an output power of 300 mW, it is estimated that it will have a range of 10 km. As a refinement the signals may be transmitted as a direct sequence spread spectrum signal. In order to do this one or more orthogonal pseudo-random code sequences are stored in a store 48. The microcontroller 24 controls the reading out of a code sequence from the store 48 which is connected to a multiplier 50 in which the pulse is multiplied by the code sequence.

In an embodiment of the system there are forty-eight (48) code sequences arranged in eight sets of six code sequences so that in the example described above there is a set for each frame in a POCSAG batch. The base stations in the selective call system and the secondary stations all store the eight sets of code sequences and the address code word(s) allocated to the secondary station indicates the frame in the batch in which the address code words will be transmitted and in so doing will select the code sequence to be used by the secondary station when replying to a signal. A reason for allocating six code sequences to each set is that a simple reply can be sent to the system controller from a secondary station via the base stations. By way of example, the following messages can be assigned to a respective code sequence in each set, that is:

Code Sequence 1—secondary station in the area for the purposes of registration only.
Code Sequence 2—Received last message.
Code Sequence 3—Read message(s).
Code Sequence 4—Answer "Yes".
Code Sequence 5—Answer "No".
Code Sequence 6—Resend last message.

In operation when a control terminal has sent a HRM to a secondary station, the microcontroller in the addressed secondary station will, if the message has been received and decoded successfully, multiply the reply pulse with, say, Code Sequence 2 and transmit the signal. As the control terminal knows to which secondary station a high rate message has been sent, the protocol will allow a suitable time to elapse before transmitting a further message to that secondary station.

An advantage of using spread spectrum signalling over transmitting a narrow band signal is that a 100 mS signal has a bandwidth of 10 Hz and such a signal would be difficult to detect as the stability of the crystals in the transmitter and receiver is unlikely to be better than 100 Hz. Spreading the signal to the width of the pager channel, say 25 kHz, should make it easier to detect. Also, two or more secondary stations can transmit their responses simultaneously without the risk of each response not being recoverable.

In the event of the control terminal having 2 or more long data messages to send to the same secondary station, it can adopt a strategy, particularly with a secondary station which is not equipped with a transmitter 46, of transmitting the first long data message, waiting for a period of time which it knows the secondary station will require to equalise, decode and store the first long data message, and then transmitting the second long data message. If the secondary station is equipped with a transmitter 46, it can transmit an acknowledgement pulse after which the control terminal will know that a second long message can be transmitted.

The ability of a secondary station to transmit an acknowledgement pulse, irrespective of whether it is multiplied with a code sequence, can be used to advantage is several ways. Firstly the ability to confirm that a secondary station is able to receive transmissions, that is, that it is not only in-range but is switched-on. In order to do this the control terminal having a long data message for a secondary station will transmit a special RIC requiring the secondary station to acknowledge substantially immediately that it is available for receipt. Thereafter the previously described procedure is followed.

Secondly if the acknowledgement pulse can be used as a registration signal, then several facilities become possible.

Figure 7:
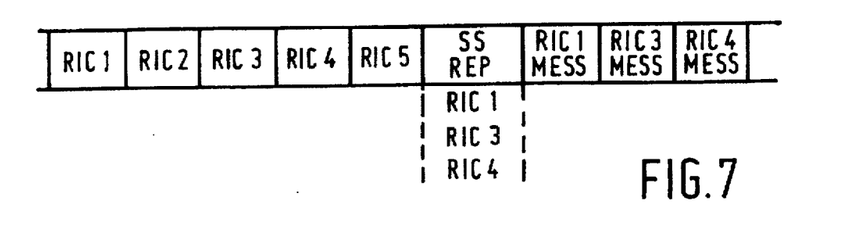
FIG. 7 is a chart illustrating the use of simultaneous spread spectrum acknowledgement signals prior to transmitting high rate data messages.

For example, if the control terminal has several long data messages which have to be transmitted to different secondary stations, it can cause the address code words, say RIC1 to RIC5—see FIG. 7, to be transmitted successively together with an indication of when the secondary stations should reply using spread spectrum techniques. As indicated in FIG. 7, these responses are transmitted using spread spectrum signalling techniques. Once the acknowledgements/registrations SS.REP have been recovered, the control terminal knows which secondary stations are switched-on, for example RIC1, RIC3 and RIC4, and can send the long data messages RIC1MESS, RIC3MESS and RIC4MESS out in succession. Each of the switched-on secondary stations on receiving the data message addressed to it can then power down its receiver and if appropriate equalise the received signal off line. As a variant of the described procedure, the control terminal can instruct by the transmission of appropriate indicia to each of the switched-on secondary stations when, relative to a time reference, say the occurrence of a sync. pulse, to energise its receiving stage in order to be able to receive its long data message.

Figure 8A:
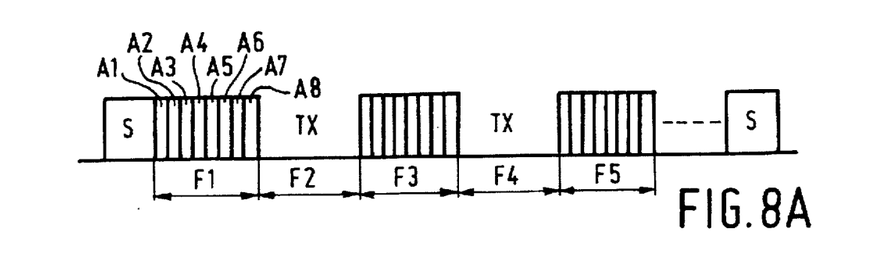
FIGS. 8A and 8B show another chart illustrating the use of acknowledgement signals.
Figure 8B:
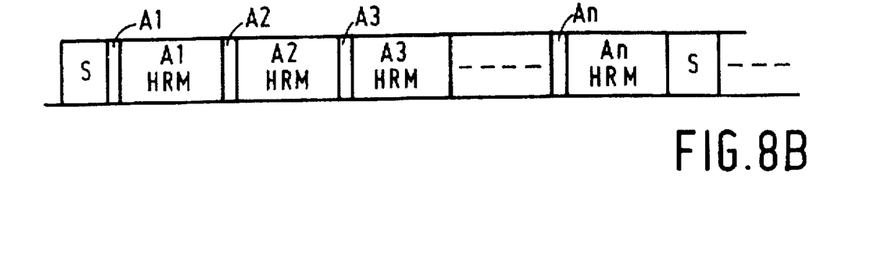

In another example illustrated in FIG. 8, the control terminal operates a registration sequence, diagram A, which is followed by a message delivery sequence, diagram B. The registration sequence makes use of the POCSAG batch format in that each batch begins with a sync code word S and is followed by eight frames. The sync code word S is selected to indicate that address code words will be transmitted at say 6.4 kb/s and in response thereto any energised secondary stations will adapt themselves accordingly. In the first frame F1 the control terminal arranges for a sequence of eight address code words to be transmitted, it then instructs the base stations to switch to receive for a time period corresponding to the F2. During F2, the addressed secondary stations, if energised, transmit their acknowledgement signals either simultaneously as spread spectrum signals or in the sequence corresponding to the transmission of the address code words, if necessary in response to an invitation by the control terminal. This cycle is repeated in the three pairs of frames remaining in the batch. Once the registration sequence, which may extend over several batches, has been completed, the control terminal then embarks on a message delivery sequence which does not necessarily conform to the POCSAG format and commences with the transmission of a sync code word S which not only has an indication of the data rate of the address code words A but also an indication that special message delivery sequence is being followed. Thereafter, a pattern of address code word A and concatenated HRM is followed until all the HRMs have been delivered. As mentioned previously the address code word includes an indication of the data rate of HRM. Also the control terminal will separate the transmissions of two HRMs to the same secondary station in order to enable the first HRM to be equalised in the interim. Acknowledgements and/or replies can be transmitted after completion of the message delivery sequence.

In the event of a secondary station not registering, the control terminal stores the message.

A further example of the use of acknowledgement pulses is if it is assumed that daily a control terminal has on average 3 long data messages for a particular secondary station. In order to reduce the number of transmissions which have to be made by the secondary station, the acknowledgement of say the second transmission can carry, for example by the selection of a predetermined spread spectrum code, a response to the first message. Examples of responses have been given above.

In the event of a secondary station only receiving a long data message infrequently, the above-mention option is not viable. The control terminal in such a situation can instruct the base station(s) to transmit a request to the pager asking it to verify receipt of the transmitted long data message.

Figure 9:
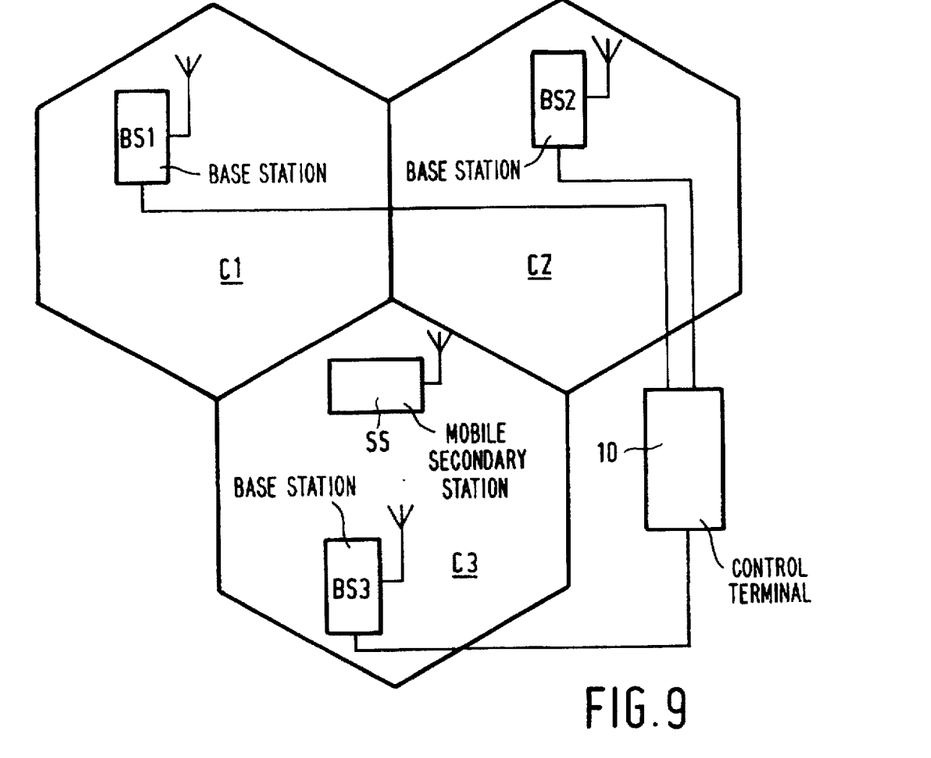
FIG. 9 is a diagram illustrating a cellular selective call system.

A registration signal produced by a secondary station can be used as a means of locating a secondary station in a non-simulcast, cellular system shown for example in FIG. 9 or a cellular system in which each cell is in fact a group of simulcast transmitters. Referring to FIG. 9, cells C1, C2 and C3 are shown conveniently as regular hexagons but their actual shape is determined by the topographical features of the geographical area concerned. Each cell has at least one base station BS1, BS2 and BS3, respectively, which may operate on a single frequency channel or respective separate frequencies which also will require the secondary station SS to be frequency agile. One advantage of a single frequency cellular arrangement over a simulcast system is that once the cell in which a secondary station is present is identified, the control terminal 10 only need instruct the base station in that cell to transmit the paging call and subsequent message, if required. This gives the possibility of a base station in a distant cell transmitting simultaneously a different message to a different secondary station on the same single frequency channel. Multiplexing transmissions by base stations using the same frequency channel is also possible, for example, by means of time sharing.

Figure 10A:
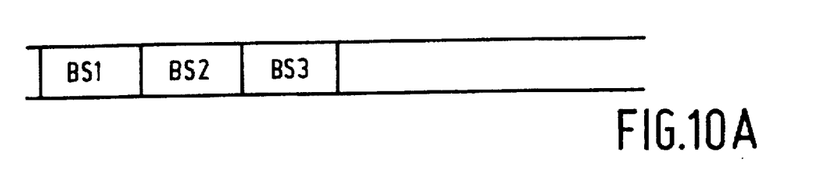
FIGS. 10A, 10B and 10C are three timing diagrams relating to the location and registration of a secondary station.
Figure 10B:
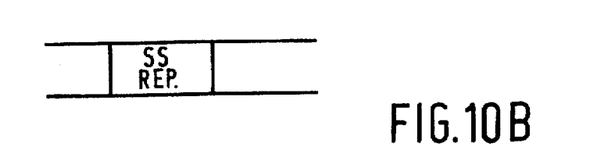
Figure 10C:
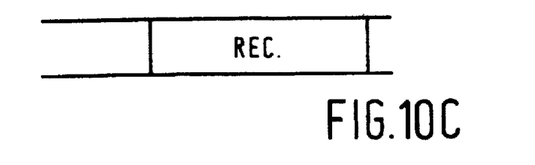

In order to establish in which cell a mobile secondary station SS is located in FIG. 9, the control terminal 10 causes each of the base stations to transmit the secondary station's address code word, in turn, as shown in diagram A of FIG. 10. The secondary station on receiving an address code word requiring it to register, transmits a low power response which may comprise a single pulse SSREP (diagram B of FIG. 10), as described previously. Each base station BS1 to BS3 switches to receive after transmission of the secondary station's address code word and expects to receive a registration signal within a predetermined time period. If no registration signal is detected then it is concluded that the secondary station is not in that cell. However it is possible if the secondary station is near the overlapping boundaries of two or more cells for each base station to detect respective registration signals. In such circumstances the base stations provide the control terminal 10 with a received signal quality estimate and the control terminal decides or votes which is the best signal and designates the cell in which the respective the base station is located as being the one in which the secondary station is present. Diagram C of FIG. 10 indicates the voting and registration REG by the control terminal.

It is possible for the control terminal 10 to initiate a secondary station location search operation by using past experience of which cell(s) the secondary station has been found to have been in previously. A system operator may require secondary station users to elect the cell in which they believe they will most likely expect to be in and initiate any location search operation at that cell.

Instead of a cell by cell search, the transmission of a secondary station's address code word can be done on the wide area broadcast channel or through the cellular network interleaved with message bodies, the latter transmissions being into every cell.

In any event once the secondary station has been located, the reception of the long data message and if appropriate its off-line equalisation is implemented in the manner described previously.

Figure 11:
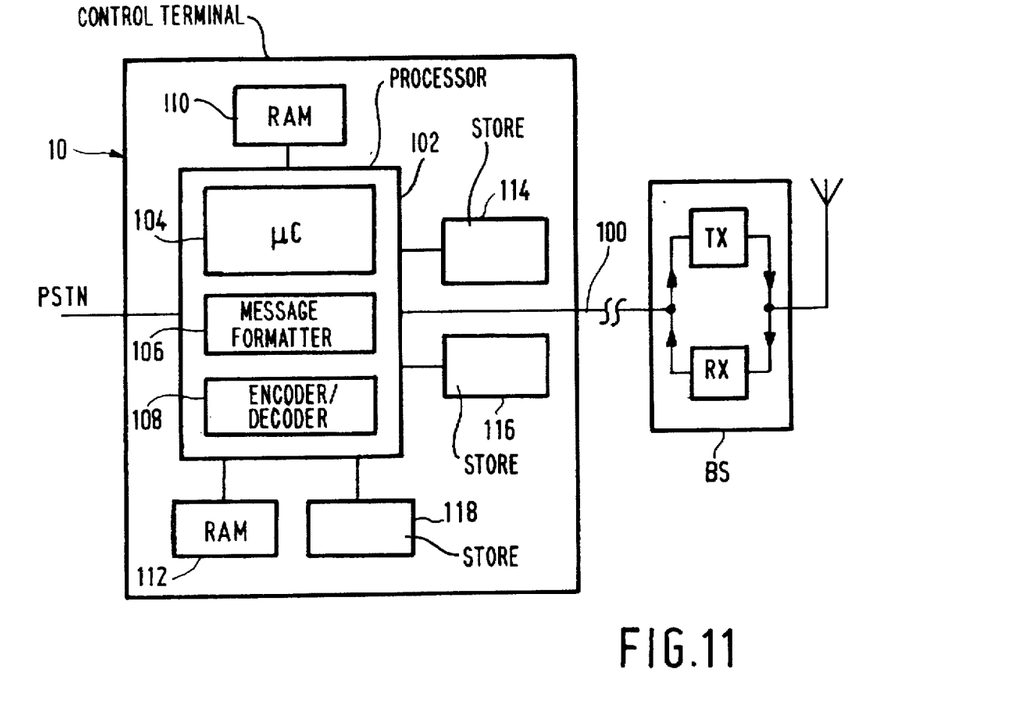
FIG. 11 is a block schematic diagram of a control terminal and a base station.

FIG. 11 illustrates for the sake of completeness a block schematic diagram of a control terminal 10 and a base station BS which is coupled to the control terminal 10 by a landline 100. The control terminal is coupled to the PSTN for the receipt of messages to be transmitted by the base station transmitter Tx and for the onward transmission of responses from secondary stations which are received by the base station receiver Rx, in each case under the control of a processor 102. The processor includes a microcomputer (with its associated program) 104, message formatting means 106 and an encoder/decoder 108. A message RAM 110 stores messages awaiting to be transmitted by the base station BS. A response RAM 112 stores responses received via the receiver Rx. Also connected to the processor 102 are a store 114 for storing RICs of all the secondary stations, a store 116 for storing all the pseudo-random code sequences and a store 118 for keeping a registration record. The base station is essentially a transceiver Tx/Rx but it may include means for measuring the strength of a received signal.

Figure 12:
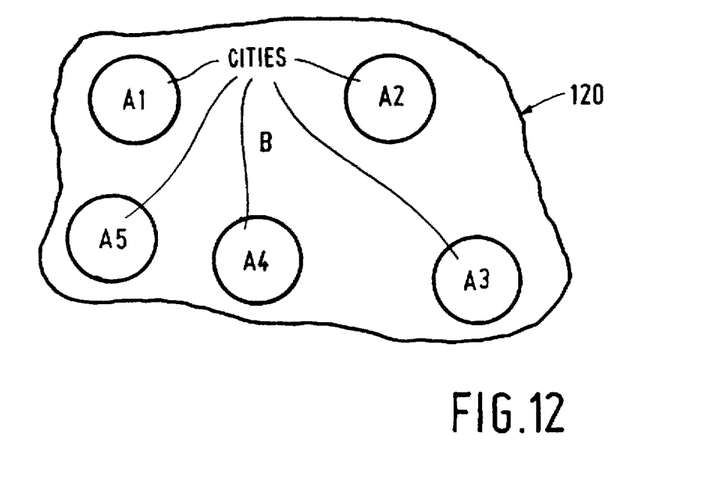
FIG. 12 is a diagram illustrating a geographical area in which there exist city areas A1 to A5 and a rural area B.

FIG. 12 illustrates a situation of a geographical region 120 which has five centres of large population, for convenience termed cities A1 to A5, located in an otherwise low populated rural area B. Each of the cities A1 to A5 has its own selective call system operating on one and the same frequency channel and the distance between the cities is such that transmissions do not interfere with each other. The rural area also has a selective call system operating on the same frequency channel as the cities. In order to deal with the different levels of selective call traffic required in the cities and in the rural area, the cities A1 to A5 are treated as five autonomous areas, the base stations in each of which are transmitting a sequence of selective calls and messages simultaneously in a first time period and the base stations in the rural area transmit a burst of selective calls in a second time period which alternates with the first time periods. By multiplexing the cities and rural area in this way it is possible for example for each of the cities to adopt a high rate message mode requiring the interleaving of selective calls transmitted at say 6.4 kb/s with long data messages transmitted at say 30 kb/s and for the rural area to operate a 1200 b/s POCSAG selective call and message service. Furthermore by grouping the cities in this way and alternating the transmissions with the area B there is achieved increased system capacity of 3 determined by the simple equation:

$$\left( \frac{\text{Number of cities} + \text{number of rural areas}}{2} \right) \text{viz} \left( \frac{5+1}{2} \right) = 3$$

Although the present invention has been described in the context of a paging system, the invention can be applied to dedicated personal radio mail systems which are independent of an existing paging system.

From reading the present disclosure, other modifications will be apparent to persons skilled in the art. Such modifications may involve other features which are already known in the design, manufacture and use of selective call systems and receivers therefor and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A selective call system comprising:

a controller;

at least one base station coupled to said controller, said at least one base station comprises a transmitter, said controller comprises means for encoding data message signals at a higher bit rate than a bit rate of address signals of an at least one secondary station; and at least one secondary station, said at least one secondary station comprises signal receiving means, decoding means coupled to the receiving means, control means which, in response to identifying an address code word, adapts said at least one secondary station to receive a higher bit rate message signal, and means for equalising the higher bit rate message signal in non-real time.

2. The selective call system as claimed in claim 1, wherein said at least one secondary station still further comprises means for determining an end of a higher bit rate message signal, and means responsive to a determination of the end of the higher bit rate message signal for initiating equalisation of the higher bit rate message signal.

3. A selective call system comprising:

a controller;

at least one base station coupled to said controller, said at least one base station comprises a transmitter, said controller comprises means for encoding data message signals at a higher bit rate than a bit rate of address signals of an at least one secondary station; and at least one secondary station, said at least one secondary station comprises signal receiving means, decoding means coupled to the receiving means, and control means which adapts said at least one secondary station to receive a higher bit rate message signal transmitted by a base station in response to identifying an address code word, and causes the message signal to be equalised in non-real time in response to receiving a higher bit rate message signal.

4. The secondary station as claimed in claim 3, further comprising means for determining an end of a higher bit rate message signal and for causing said control means to initiate an equalisation of the data message signal upon a determination of the end of the higher bit rate message signal.

5. A selective call system comprising:

a controller, at least one base station coupled to the controller, the base station having a transmitter for transmitting signals at preselected, predetermined bit rates, and at least one secondary station having a receiver for receiving signals transmitted by the at least one base station, the at least one secondary station being responsive to the receipt of at least two address code words, each of said address code words including indicia indicating a respective bit rate of a data message signal, wherein the controller has means for formatting encoded data message signals as an address code word and concatenated data message code words, and means for selecting an address code word indicating a transmission bit rate of the concatenated data message code words which transmission bit rate is higher than the transmission bit rate of the address code word, and wherein the at least one secondary station further comprises decoding means and control means, said decoding means coupled to said receiver, and wherein said control means in response to determining said indicia in a received address code word causes the decoding means to adapt itself to receive the concatenated higher bit rate message code words.

6. The system as claimed in claim 5, wherein the message signal is formatted differently from the address code word.

7. The selective call system as claimed in claim 5 further wherein said system is a synchronous system, said controller formats a packet to be transmitted, the packet having a batch structure of batches, each batch consisting of a synchronization code word and a predetermined number of frames, said at least one secondary station is allocated to a predetermined frame, and wherein for each batch, the controller selects a synchronization code word indicative of at least the data rate of the address code word, and wherein said at least one secondary station further comprises means responsive to the synchronization code word for configuring said secondary station in readiness to receive an address code word which may be transmitted in its predetermined frame of a batch.

8. The selective call system as claimed in claim 5, wherein said at least one secondary station further comprises transmitter means and means for generating a response signal, and further wherein said at least one base station further comprises a receiver.

9. The selective call system as claimed in claim 8, wherein said at least one secondary station still further comprises means for generating a code sequence and for multiplying the response signal with the code sequence to form a product, wherein the product is transmitted as a spread spectrum signal, and further wherein the controller comprises means for generating said code sequence and for multiplying the received spread spectrum signal by said generated code sequence.

10. The selective call system as claimed in claim 9, wherein said at least one base station comprises a plurality of base stations which define geographically distributed cells, and wherein each base stations' transmissions are multiplexed on a single transmission channel.

11. The selective call system as claimed in claim 10, further wherein each base station has a receiver, and wherein said controller further comprises means for causing each base station in turn to transmit an address signal of a secondary station, wherein the secondary station in response to detecting its address, transmits a response signal, and wherein said controller registers the secondary station as being present in the cell of the base station receiving the response signal.

12. The selective call system as claimed in claim 11, wherein said controller still further comprises means for storing preferred cell registrations of the secondary station.

13. The selective call system as claimed in claim 12, wherein said controller still further comprises means for storing historical cell location information relating to a secondary station, and means for utilising the historical cell location information in determining a search pattern for a selective call receiver.

14. A secondary station for use in a selective call system as claimed in claim 5, said secondary station comprising signal receiving means, decoding means coupled to the receiving means, and control means which, in response to identifying an address code word, adapts said secondary station to receive a higher bit rate message signal transmitted by a base station.

15. A selective call system as claimed in claim 5, wherein at least one secondary station further comprises transmitting means, means for storing a plurality of code sequences indicative of respective possible predetermined responses to a received message signal and means for selecting one of said plurality of code sequences to be transmitted by said transmitting means, said controller further comprises means for identifying the code sequence in a received signal and thereby identify a response from the secondary station.

16. The selective call system as claimed in claim 15, wherein said controller further comprises means for arranging a sequence of address code words relating to an addressing of a plurality of respective secondary stations, the sequence of address code words to be transmitted together with an indication of when the plurality of secondary stations should reply, said controller still further comprises means for determining from a plurality of replies which of the addressed secondary stations are active and, in response thereto, for transmitting higher bit rate message signals as spread spectrum signals to those active addressed secondary stations.

17. The selective call system as claimed in claim 16, wherein said controller still further comprises means for ordering a sequence of, and for determining a duration of, respective higher bit rate message signals, and means for causing indicia to be transmitted to those secondary stations to whom higher bit rate message signals are to be sent, the indicia indicating when, relative to a time reference, each of the secondary stations should expect to receive its high bit rate message signal.

18. A selective call system as claimed in claim 5, wherein said controller further comprises means for generating registration invitation signals for transmitting by the at least one base station and wherein said at least one secondary station further comprises means for generating a registration signal in response to the receipt of an invitation signal and for transmitting said registration signal.

19. The selective call system as claimed in claim 18, wherein said at least one secondary station still further comprises means for transmitting the registration signal as a spread spectrum signal, and wherein said at least one base station still further comprises means for receiving the spread spectrum signal and for recovering the registration signal.

20. The selective call system as claimed in claim 19, further comprising control means coupled to said at least one base station for causing said at least one base station to transmit the registration invitation signals in groups.

21. The selective call system as claimed in claim 20, wherein said at least one base station still further comprises a plurality of base stations, the plurality of base stations cover a respective predetermined geographical area and wherein the registration invitation signals are transmitted on an area by area basis.

22. A system as claimed in claim 5, wherein the controller has means for storing at least two synchronization code words, each of said at least two synchronization code words including indicia indicative of respective different transmission bit rates of the at least two secondary station address code words.

23. A selective call system comprising:
- a controller,
- at least one base station coupled to the controller, the base station having a transmitter for transmitting signals at preselected, predetermined bit rates, and
- at least one secondary station having a receiver for receiving signals transmitted by the at least one base station, the at least one secondary station having at least two addresses, each of said addresses including indicia indicating a respective bit rate of a concatenated data message signal,
- wherein the controller has means for formatting encoded data message signals as an address code word and concatenated data message code words, and means for selecting an address code word indicating a transmission bit rate of the concatenated data message code words which transmission bit rate is higher than the transmission bit rate of the address code word, and wherein the at least one secondary station further comprises decoding means coupled to the receiving means, control means responsive to determining said indicia in a received address code word for causing the decoding means to adapt itself to receive the concatenated higher bit rate message code words, and means for equalizing the higher bit rate message code words in non-real time.

24. A selective call system comprising:
- a controller,
- at least one base station coupled to the controller, the base station having a transmitter for transmitting signals at preselected, predetermined bit rates, and
- at least one secondary station having a receiver for receiving signals transmitted by the at least one base station, the at least one secondary station being responsive to the receipt of at least two address code words, each of said address code words including indicia indicating a respective bit rate of a data message signal,
- wherein the controller has means for formatting encoded data message signals as an address code word and concatenated data message code words, and means for selecting an address code word indicating a transmission bit rate of the concatenated data message code words which transmission bit rate is higher than the transmission bit rate of the address code word, and wherein the at least one secondary station further comprises decoding means coupled to the receiver, control means for causing the decoding means to adapt itself to receive the concatenated higher bit rate message code words, means for equalizing the higher bit rate message code words in non-real time, means for determining the end of the last of the concatenated higher bit rate message code words, and means responsive to said determination for initiating the equalization of the higher bit rate message code words.

25. A secondary station for use in selective call system comprising:
- a controller, and
- at least one base station coupled to the controller, the base station having a transmitter for transmitting signals at preselected, predetermined bit rates to the secondary station, said secondary station being responsive to the receipt of at least two address code words, each of said address code words including indicia indicating a respective bit rate of a data message signal,
- wherein the controller has means for formatting encoded data message signals as an address code word and concatenated data message code words, and means for selecting an address code word indicating a transmission bit rate of the concatenated data message code words which transmission bit rate is higher than the transmission bit rate of the address code word, and
- wherein the secondary station comprises a receiver for receiving signals transmitted by the at least one base station, decoding means coupled to the receiver, and control means for causing the decoding means to adapt itself to receive the concatenated higher bit rate message code words in response to determining said indicia in a received address code word.

26. The secondary station as claimed in claim 25, wherein said control means comprises means for reconfiguring said secondary station in response to an indicia in a synchronization code word in order for said secondary station to be able to receive an address code word.

27. The secondary station as claimed in claim 26, wherein the reconfiguring means adapts said secondary station in response to an indicia in an address code word in order for said secondary station to be able to receive a data message.

28. The secondary station as claimed in claim 25, wherein said control means comprises means for generating a response signal in response to the receipt of a higher bit rate message signal, and said secondary station further comprising transmitting means coupled to the control means for transmitting the response signal.

29. The secondary station as claimed in claim 28, still further comprising means for storing a plurality of spread spectrum code sequences, and said control means further comprises means for selecting one of the plurality of code sequences to be used in transmitting a response.

30. A secondary station for use in selective call system comprising:
- a controller, and
- at least one base station coupled to the controller, the base station having a transmitter for transmitting signals at preselected, predetermined bit rates to the secondary station which is responsive to the receipt of at least two address code words, each of said address code words including indicia indicating a respective bit rate of a data message signal,
- wherein the controller has means for formatting encoded data message signals as an address code word and concatenated data message code words, and means for selecting an address code word indicating a transmission bit rate of the concatenated data message code words which transmission bit rate is higher than the transmission bit rate of the address code word, and wherein the secondary station comprises a receiver for receiving signals transmitted by the at least one base station, decoding means coupled to the receiver, control means for causing the decoding means to adapt itself to receive the concatenated higher bit rate message code words, and means for equalizing the higher bit rate message code words in non-real time.

31. A secondary station for use in selective call system comprising:

a controller, and at least one base station coupled to the controller, the base station having a transmitter for transmitting signals at preselected, predetermined bit rates to the secondary station which is responsive to the receipt of at least two address code words,, each of said address code words including indicia indicating a respective bit rate of a concatenated data message signal, wherein the controller has means for formatting encoded data message signals as an address code word and concatenated data message code words, and means for selecting an address code word indicating a transmission bit rate of the concatenated data message code words which transmission bit rate is higher than the transmission bit rate of the address code word, and wherein the secondary station comprises a receiver for receiving signals transmitted by the at least one base station, decoding means coupled to the receiver, control means for causing the decoding means to adapt itself to receive the concatenated higher bit rate message code words, means for equalizing the higher bit rate message code words in non-real time, means for determining the end of the last of the concatenated higher bit rate message code words, and means responsive to said determination for initiating the equalization of the higher bit rate message code words.

* * * * *